United States Patent
Reimchen

(10) Patent No.: US 10,724,583 B2
(45) Date of Patent: Jul. 28, 2020

(54) OVERRUNNING CLUTCH UNIT AND GEAR MECHANISM DEVICE HAVING THE OVERRUNNING CLUTCH UNIT

(71) Applicant: Schaeffler Technologies AG & Co. KG, Herzogenaurach (DE)

(72) Inventor: Alexander Reimchen, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 106 days.

(21) Appl. No.: 15/964,181

(22) Filed: Apr. 27, 2018

(65) Prior Publication Data

US 2018/0328418 A1  Nov. 15, 2018

(51) Int. Cl.

| F16D 41/067 | (2006.01) |
| F16C 17/02 | (2006.01) |
| F16C 19/46 | (2006.01) |
| F16C 21/00 | (2006.01) |
| F16C 33/46 | (2006.01) |
| F16D 43/18 | (2006.01) |
| F16D 41/06 | (2006.01) |

(52) U.S. Cl.
CPC ............ *F16D 41/067* (2013.01); *F16C 17/02* (2013.01); *F16C 19/46* (2013.01); *F16C 19/463* (2013.01); *F16C 21/00* (2013.01); *F16C 33/4605* (2013.01); *F16D 43/18* (2013.01); *F16C 2361/43* (2013.01); *F16D 2041/0601* (2013.01)

(58) Field of Classification Search
CPC ...... F16D 41/066; F16D 41/067; F16C 17/02; F16C 19/26; F16C 19/46; F16C 21/00
See application file for complete search history.

(56) References Cited

U.S. PATENT DOCUMENTS

| 3,542,442 A | * | 11/1970 | Kent | ................... F16C 33/6677 384/473 |
| 4,236,619 A | * | 12/1980 | Kuroda | ................... F16C 17/26 192/45.016 |
| 5,343,991 A | * | 9/1994 | Premiski | ................. F16C 19/28 192/110 B |
| 5,346,668 A | * | 9/1994 | Tanaka | ..................... C22C 9/04 420/473 |

(Continued)

FOREIGN PATENT DOCUMENTS

| DE | 2225394 A | 12/1973 |
| DE | 2719685 A1 | 11/1978 |

(Continued)

*Primary Examiner* — David R Morris
(74) *Attorney, Agent, or Firm* — Reid Baldwin

(57) ABSTRACT

An overrunning clutch unit may include inner and outer rings that can be rotated relative to each other. Clamping members may transmit a torque between the two rings in one peripheral direction, the clamping members being arranged between the rings. A first bearing device may be configured to support the two rings, wherein the first bearing device is arranged between the rings at a first axial side of the clamping members. A second bearing device may be configured to support the two rings, wherein the second bearing device is arranged at a second, opposing, axial side of the clamping members so that a tilting of the inner ring relative to the outer ring is prevented.

8 Claims, 2 Drawing Sheets

(56) References Cited

U.S. PATENT DOCUMENTS

| | | | | |
|---|---|---|---|---|
| 5,517,957 A * | 5/1996 | Wagner | ............... | F02B 67/06 |
| | | | | 123/192.1 |
| 7,004,861 B2 * | 2/2006 | Fujiwara | ............ | F16D 41/067 |
| | | | | 474/74 |
| 9,995,349 B2 * | 6/2018 | Fujiwara | ............ | F16D 41/07 |
| 2002/0183147 A1 * | 12/2002 | Fujiwara | ............ | F16H 55/36 |
| | | | | 474/70 |
| 2015/0204395 A1 * | 7/2015 | Mori | ............ | F16D 41/067 |
| | | | | 192/45.008 |
| 2016/0195145 A1 * | 7/2016 | Fujiwara | ............ | F16D 41/07 |
| | | | | 290/55 |
| 2019/0226535 A1 * | 7/2019 | Inukai | ............ | F16C 19/16 |

FOREIGN PATENT DOCUMENTS

| | | |
|---|---|---|
| DE | 102012210100 A1 | 1/2013 |
| DE | 102013107420 A1 | 1/2014 |
| DE | 102013213436 A1 | 1/2015 |
| DE | 102014209119 A1 | 11/2015 |

* cited by examiner

OVERRUNNING CLUTCH UNIT AND GEAR MECHANISM DEVICE HAVING THE OVERRUNNING CLUTCH UNIT

CROSS-REFERENCE TO RELATED APPLICATIONS

This application claims priority to DE 10 2017 110 085.7 filed May 10, 2017 and to DE 10 2017 127 528.2 filed Nov. 22, 2017, the entire disclosures of which are incorporated by reference herein.

TECHNICAL FIELD

This disclosure relates to an overrunning clutch unit and to a gear mechanism device having the overrunning clutch unit.

BACKGROUND

An overrunning clutch system is a directionally switched clutch which is used in an extremely wide variety of application fields in order to decouple a portion of a drive train from the rotational movement when the load relationships are changed. Overrunning clutch systems are used, for example, in automatic gear mechanisms for motor vehicles in which the overrunning clutch system is preferably used as a support element or backstop device. Furthermore, overrunning clutch systems may also be used in truck or industrial gear mechanisms.

Such overrunning clutch systems may have an outer ring and an inner ring, wherein there are arranged between the two rings clamping members which, in the event of a rotation of the outer and/or the inner ring, produce a non-positive-locking connection between the rings. The inner ring and the outer ring are in this instance rotatably supported at one side by a bearing.

The publication DE 10 2014 209 119 A1 discloses an overrunning clutch unit comprising an inner ring which cooperates with a shaft and an outer ring which cooperates with a flange, which rings are at least partially surrounded by a carrier with a toothed outer peripheral face for receiving clutch plates, wherein radially between the inner ring and the outer ring a drawn cup roller clutch for transmitting a torque in a single direction and a sliding ring for centering the inner ring with respect to the outer ring are arranged, wherein the outer ring and the flange are connected to each other by a first materially engaging connection and the flange and the carrier are connected to each other by a second materially engaging connection.

SUMMARY

One object of the present disclosure is to propose an overrunning clutch unit which is distinguished by improved operational behavior.

This object is achieved by an overrunning clutch unit and a gear mechanism device having the features disclosed herein. Additional embodiments are also described in the following description and the appended figures.

The disclosure relates to an overrunning clutch unit which is in particular constructed and/or suitable for a gear mechanism device. In particular the overrunning clutch unit may act as a support element and/or backstop device in the gear mechanism device. The gear mechanism device may be constructed as an automatic gear mechanism for a motor vehicle or as a gear mechanism for a utility vehicle or as an industrial gear mechanism.

The overrunning clutch unit may include an overrunning clutch system inner ring and an overrunning clutch system outer ring. The overrunning clutch system inner ring serves in particular to receive a shaft. The overrunning clutch system inner ring and the overrunning clutch system outer ring may be constructed as a hollow cylinder in each case. The overrunning clutch system inner ring may have on the inner covering face thereof a first toothed portion which meshes and/or is in engagement with a second toothed portion of the shaft. For example, the first toothed portion is constructed as an inner tooth arrangement and the second toothed portion is constructed as an outer tooth arrangement.

The overrunning clutch system outer ring serves in particular to transmit a torque to a flange and/or to a carrier housing. To this end, the overrunning clutch system outer ring may be connected to the flange and/or the carrier housing in a rotationally secure manner. Preferably, the flange and/or the carrier housing is/are arranged on a first end face of the overrunning clutch system outer ring. In particular the overrunning clutch system rings are constructed as separate components. Alternatively, the overrunning clutch system rings may also be constructed as part-regions of the separate components. Alternatively, the overrunning clutch system outer ring may itself be constructed as a plate carrier.

The overrunning clutch system inner ring may be arranged coaxially and/or concentrically in relation to a common rotation axis with respect to the overrunning clutch system outer ring. The overrunning clutch system outer ring may have a larger diameter than the overrunning clutch system inner ring, wherein in particular the overrunning clutch system inner ring is arranged radially inside the overrunning clutch system outer ring. The overrunning clutch system inner ring and the overrunning clutch system outer ring can be rotated relative to each other in a peripheral direction with respect to the rotation axis.

The overrunning clutch unit may have a plurality of clamping members which are constructed and/or suitable for transmitting the torque between the two overrunning clutch system rings in precisely one peripheral direction, in particular with respect to the rotation axis. Preferably, the clamping members are components of a drawn cup roller clutch. The clamping members can be constructed as clamping rollers or detents.

The clamping members may be arranged between the overrunning clutch system inner ring and the overrunning clutch system outer ring. In particular, the clamping members enable a rotation of the two overrunning clutch system rings in a first rotation direction, wherein in a second opposed rotation direction a non-positive-locking connection between the two overrunning clutch system rings is achieved via the clamping members. The non-positive-locking connection may be achieved by a tilting of the detents or by the clamping rollers which clamp on clamping ramps so that a rotation of the two overrunning clutch system rings in the second rotation direction is blocked. In particular, the clamping members may be retained in a rotatable gear shift cage.

The overrunning clutch unit may have a first bearing device for supporting the two overrunning clutch system rings. The first bearing device may be used for the radial and/or axial support of the two overrunning clutch system rings. The first bearing device may be arranged radially between the overrunning clutch system inner ring and the overrunning clutch system outer ring at a first axial side of the clamping members. In particular, the first bearing device may be in abutment with an outer periphery of the overrunning clutch system inner ring and an inner periphery of the overrunning clutch system outer ring.

In the context of the disclosure, the overrunning clutch unit may include a second bearing device for supporting the two overrunning clutch system rings. In particular, the second bearing device serves to radially and/or axially support the two overrunning clutch system rings. Preferably, the two bearing devices are arranged spaced apart from each other. In particular, the first and/or the second bearing device may be arranged coaxially and/or concentrically with respect to the rotation axis.

The second bearing device may be arranged at a second opposing axial side of the clamping members so that a tilting of the first overrunning clutch system ring relative to the second overrunning clutch system ring is prevented. In particular, the clamping members may be arranged in an axial direction between the two bearing devices. Preferably, the first bearing device is arranged at a first axial end region of the overrunning clutch system inner ring and/or outer ring and/or the second bearing device is arranged at a second opposing axial end region of the overrunning clutch system inner ring and/or outer ring. Consequently, a rigid support of the two overrunning clutch system rings may be produced.

An advantage of the disclosure may be that, as a result of the arrangement of the second bearing device, a tilting of the overrunning clutch system rings is prevented. Consequently, a centering of the housing and/or the clamping members or the drawn cup roller clutch on the overrunning clutch system inner ring can be ensured, whereby the operational reliability of the overrunning clutch unit is significantly increased. Furthermore, as a result of the two bearing devices, a highly durable bearing support of the overrunning clutch unit may be formed.

In an embodiment of the disclosure, the first and/or the second bearing device is/are constructed as a roller bearing device. In particular, the roller bearing device may be constructed as a radial bearing or an angular contact bearing. Preferably, the roller bearing device is constructed as a roller bearing or a ball bearing. In one embodiment, the first bearing device is constructed as a roller bearing and the second bearing device as a needle bearing.

The roller bearing device, in particular the roller bearing as a first bearing device and the needle bearing as a second bearing device, may have an inner ring and/or an outer ring. Alternatively or optionally additionally, the overrunning clutch system inner ring has on the outer periphery thereof and/or the overrunning clutch system outer ring has on the inner periphery thereof a running face. The roller members of the roller member device, in particular the rollers of the first bearing device and the needles of the second bearing device, may roll between the running face of the overrunning clutch system inner ring and/or the overrunning clutch system outer ring and/or the inner ring and/or the outer ring.

In one embodiment, the overrunning clutch unit comprises a flange element for arrangement between the second bearing device and the overrunning clutch system outer ring. Preferably, the flange element has a bearing portion having a bearing face and a positive-locking connection portion. In particular, the flange element may be supported on the second bearing device as the needle bearing.

Another embodiment of the disclosure makes provision for the flange element to be connected in an interference fit and/or press fit and/or by positive-locking connection to at least one of the overrunning clutch system inner rings, preferably to the overrunning clutch system outer ring. Preferably, the overrunning clutch system outer ring has to this end a receiving member in which the flange element engages with the positive-locking connection portion in a positive-locking manner. The engagement is preferably released by an interference fit and/or press fit.

In an alternative or optionally additional embodiment of the disclosure, the first and/or the second bearing device is/are constructed as a plain bearing device. In particular, the plain bearing device is constructed as a sliding ring or as a sliding disk. Preferably, the first bearing device may be constructed as the roller bearing device and the second bearing device as the plain bearing device.

In one embodiment, the plain bearing device is connected to a first of the two overrunning clutch system rings. In particular, the plain bearing device may be connected in a positive-locking manner and/or non-positive-locking manner and/or frictionally engaging manner and/or materially engaging manner to the overrunning clutch system outer ring or the overrunning clutch system inner ring. For example, the plain bearing device is pressed into the overrunning clutch system outer ring or onto the overrunning clutch system inner ring.

The plain bearing device has a first sliding face and the second of the two overrunning clutch system rings has a second sliding face, wherein a plain bearing contact is formed between the first and the second sliding face. In particular, the plain bearing device may be constructed in a rough form as a hollow cylinder or a collared sleeve. In this instance, the plain bearing device may have the first sliding face on an inner covering face and/or an outer covering face. The overrunning clutch system inner ring may have the second sliding face on the outer periphery thereof and/or the overrunning clutch system outer ring may have the second sliding face on the inner periphery thereof. In particular, the sliding contact may be formed directly by the first and the second plain bearing face.

In one embodiment, the plain bearing device and/or the plain bearing contact is/are dry lubricated. In particular, the first and/or the second sliding face may have self-lubricating properties. Preferably, in the plain bearing contact there is produced solid state friction. For example, the plain bearing device, in particular the first and/or the second plain bearing face, may be formed of plastics material, for example PE, PTFE, PFA and/or of a metal alloy, for example copper/tin, lead/tin, etc. Optionally in addition at least one of the two plain bearing faces can be mechanically smoothed, for example rolled.

Alternatively or optionally additionally, the plain bearing device and/or the plain bearing contact is/are lubricated by a lubricant. Preferably, in the plain bearing contact there is produced a mixed friction or a liquid friction. In particular, the lubricant may be a solid or a fatty or an oily lubricant.

In another embodiment, the plain bearing device has a sleeve portion and a collar portion. Preferably, the plain bearing device may be constructed to this end as the collared sleeve. In particular, the collar portion may be constructed as a radially outwardly directed flange or collar. Preferably the collar portion is directly adjacent to the sleeve portion.

The plain bearing device may be connected by the collar portion to the first of the two overrunning clutch system rings. In particular, the collar portion may be connected in a materially engaging and/or frictionally engaging manner and/or non-positive-locking and/or positive-locking manner to the overrunning clutch system outer ring and/or overrunning clutch system inner ring. Preferably, the collar portion is arranged on a second end face of the overrunning clutch system outer ring which in particular forms a counter-face to the first end face.

The sleeve portion may have the first sliding face and is in abutment with the second of the two overrunning clutch system rings. In particular, the sleeve portion has on the inner covering face the first sliding face. Preferably, the sleeve portion is fitted on the overrunning clutch system inner ring. Alternatively, the sleeve portion may have been pushed into the overrunning clutch system outer ring.

In another embodiment of the disclosure, the plain bearing device is formed from a non-ferrous heavy metal. In one embodiment, the plain bearing device is constructed in an integral manner, for example as a shaped sheet metal component. In particular, the plain bearing device may have a softer material than the overrunning clutch system inner ring and/or the overrunning clutch system outer ring. For example, the plain bearing device has as a material a copper alloy, in particular bronze or brass, or an aluminum alloy. As a result of the simple construction of the plain bearing device, the second bearing device can consequently be constructed in a cost-effective manner.

In one embodiment, the plain bearing device is connected to the overrunning clutch system inner ring and/or the overrunning clutch system outer ring by a snap-fit connection. In principle, the snap-fit connection may be constructed as a non-releasable snap-fit connection. Preferably, however, the snap-fit connection may be constructed as a releasable snap-fit connection. In another embodiment, the snap-fit connection is constructed as an annular snap-fit connection. Consequently, a simple assembly and/or disassembly of the plain bearing device can be ensured.

In a development of the disclosure, the plain bearing device has an active contour and the overrunning clutch system inner ring and/or the overrunning clutch system outer ring has a counter-contour, wherein the active contour and the counter-contour form the snap-fit connection. In particular, the collar portion may have a bent-up portion as the active contour. Preferably, the bent-up portion has an angled end so that in particular a rotationally symmetrical annular snap-fitting hook is formed. Preferably, the active contour is constructed to be completely continuous or interrupted in the peripheral direction. In particular, the sleeve portion and the active contour may be directed counter to or in the same direction as each other in an axial direction.

The counter-contour may, for example, be constructed as an annular groove and/or web and/or notch. Preferably, the counter-contour forms a contour partner for the active contour, wherein the active contour and the counter-contour in a radial and/or axial direction with respect to the rotation axis form a positive-locking connection. In this instance, the active contour and/or the counter-contour may be constructed to be resiliently deformable so that, in particular when the plain bearing device is assembled, the active contour and/or the counter-contour become resiliently deformed and subsequently engage with each other.

Another subject-matter of the disclosure relates to a gear mechanism device having the overrunning clutch unit, as described above or as claimed in one of the preceding claims. In particular, the gear mechanism device may be constructed as the automatic gear mechanism.

BRIEF DESCRIPTION OF THE DRAWINGS

Other features, advantages and effects of the disclosure emerge from the following description of embodiments of the disclosure. In the drawings.

DETAILED DESCRIPTION

Figure 1:
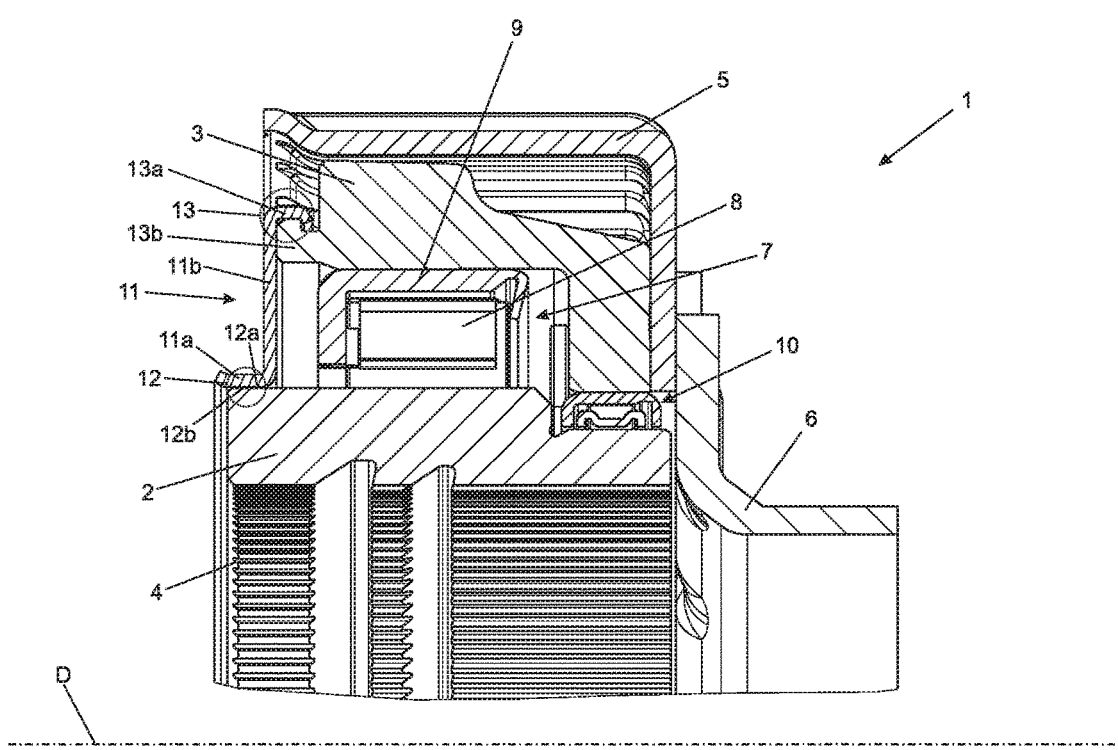
FIG. 1 is a sectioned illustration of an overrunning clutch unit as an embodiment of the disclosure.

Mutually corresponding or identical components may be given the same reference numerals in the figures.

FIG. 1 is a sectioned illustration of an overrunning clutch unit 1 for a gear mechanism device, according to an embodiment. For example, the gear mechanism device is constructed as an automatic gear mechanism for a motor vehicle. The overrunning clutch unit 1 may in this instance act, for example, as a support element and/or a backstop device. The overrunning clutch unit 1 has an overrunning clutch system inner ring 2 and an overrunning clutch system outer ring 3, wherein the two overrunning clutch system rings 2, 3 can be rotated relative to each other.

The two overrunning clutch system rings 2, 3 are constructed in a rough form as a hollow cylinder and are arranged in relation to a rotation axis D coaxially and/or concentrically with respect to each other. The overrunning clutch system outer ring 3 has in this instance a greater diameter than the overrunning clutch system inner ring 2, wherein the overrunning clutch system inner ring 2 is received in the overrunning clutch system outer ring 3.

The overrunning clutch system inner ring 2 serves to receive a shaft. To this end, the overrunning clutch system inner ring 2 has at the radial inner side thereof an inner tooth arrangement 4 as a first toothed portion which meshes and/or is in engagement, for example, with an outer tooth arrangement of the shaft. The overrunning clutch system outer ring 3 serves to transmit a torque to a carrier housing 5 or a flange 6. For example, the carrier housing 5 has on the outer peripheral face thereof a plug type tooth arrangement for receiving clutch plates. The carrier housing 5 is constructed in a pot-like manner, wherein the overrunning outer ring 3 is received in the carrier housing 5. Preferably, the overrunning outer ring 3, the carrier housing 5 and the flange 6 rotate together about the rotation axis D and/or are arranged coaxially relative thereto.

The carrier housing 5 may be in abutment between a radially extending portion of the overrunning clutch system outer ring 3 and the flange 6. For example, the overrunning clutch system outer ring 3, the carrier housing 5 and the flange 6 may be connected to each other in a materially engaging manner, for example, by a weld connection.

The overrunning clutch unit 1 may have a drawn cup roller clutch 7, wherein the drawn cup roller clutch 7 is arranged radially between the overrunning clutch system inner ring 2 and the overrunning clutch system outer ring 3. The drawn cup roller clutch 7 may have a plurality of individual clamping members 8 which are retained in a rotatable gear shift cage 9. The clamping members 8 may serve in this instance to transmit the torque between the two overrunning clutch system rings 2, 3 in precisely one peripheral direction with respect to the rotation axis D. In a first rotation direction, the clamping members 8 may enable a rotation of the two overrunning clutch system rings 2, 3 counter to each other. In an opposing direction acting as a second rotation direction, there may be a non-positive-locking connection between the two overrunning clutch system rings 2, 3 so that a relative rotation of the two overrunning clutch system rings 2, 3 in the second rotation direction is prevented.

For example, the clamping members 8 may be constructed as clamping rollers, wherein at least one of the two overrunning clutch system rings 2, 3 has clamping ramps. In a locked position of the clamping members 8, the clamping rollers may become jammed together with the clamping ramps. Consequently, a rotation of the overrunning clutch system inner ring 2 and overrunning clutch system outer ring 3 in the first rotation direction may be enabled and in the second opposing rotation direction, as a result of the locking, there may be entrainment between the overrunning clutch system inner ring 2 and the overrunning system outer ring 3.

The overrunning clutch unit 1 has a first bearing device 10, wherein the first bearing device 10 may be constructed as a roller bearing device. For example, the first bearing device 10 is constructed as a radial roller bearing. The first bearing device may be arranged radially between the overrunning clutch system outer ring 3 and the overrunning clutch system inner ring 2. The first bearing device 10 is preferably arranged in the region of the radial portion of the overrunning clutch system outer ring 3 at a first axial side of the drawn cup roller clutch 7. In particular, the first bearing device 10 may be arranged at a first axial end region of the two overrunning clutch system rings 2, 3.

The overrunning clutch unit 1 may have a second bearing device 11, wherein the second bearing device 11 may be constructed as a plain bearing device. The first and the second bearing devices 10, 11 serve to radially support the two overrunning clutch system rings 2, 3, wherein the second bearing device 11 may be arranged at a second opposing axial side of the drawn cup roller clutch 7. In particular, the second bearing device 11 may be arranged at an axial second end region of the two overrunning clutch system rings 2, 3 opposite the first end region.

Consequently, the two overrunning clutch system rings 2, 3 may be supported at both sides, wherein the drawn cup roller clutch 7 is arranged axially between the two bearing devices 10, 11. As a result of the dual-sided support, a tilting or inclining of the two overrunning clutch system rings 2, 3 or the drawn cup roller clutch 7 may be prevented.

The second bearing device 11 may be constructed as a collared sleeve and has a rotationally symmetrical sleeve portion 11*a* and a flange portion 11*b*. The sleeve portion 11*a* and the flange portion 11*b* may be directly connected to each other, wherein the flange portion 11*b* is constructed as a radially outwardly directed flange. For example, the sleeve portion 11*a* and the flange portion 11*b* may be constructed integrally, for example, as a shaped sheet metal component.

The sleeve portion 11*a* and the overrunning clutch system inner ring 2 may be arranged coaxially with respect to the rotation axis D. The sleeve portion 11*a* may be fitted in such a manner to the overrunning clutch system inner ring 2 that the sleeve portion 11*a* is supported in a radial direction on an outer periphery of the overrunning clutch system inner ring 2. The sleeve portion 11*a* has a first sliding face 12*a* and the overrunning clutch system inner ring 2 has a second sliding face 12*b*, wherein a plain bearing contact 12 is formed between the first and the second sliding face 12*a, b*. The first sliding face 12*a* may be formed by an inner covering face of the sleeve portion 11*a*. The second sliding face 12*b* may be rearranged in the region of the sleeve portion 11*a* and formed by an outer covering face of the overrunning clutch system inner ring 2. For example, the second bearing device 11, in particular the sleeve portion 11*a*, may be produced from a non-ferrous heavy metal, for example, a copper alloy, wherein the sliding contact 12 may be dry lubricated.

The second bearing device 11 may be connected to the overrunning clutch system outer ring 3 by a snap-fit connection 13. To this end, the second bearing device 11 has an active contour 13*a* and the overrunning clutch system outer ring 3 has a counter-contour 13*b*. The active contour 13*a* may be formed by a bent-up portion of the flange portion 11*b* and is orientated in an axial direction counter to the sleeve portion. The active contour 13*a* or the bent-up portion may be bent at the end side so that, for example, a rotationally symmetrical continuous or interrupted snap-fitting hook element is formed.

The counter-contour 13*b* may be arranged at an end face of the overrunning clutch system outer ring 3 facing the flange portion 11*b*. The counter-contour 13*b* may be, in this instance, constructed as a web which extends in a peripheral direction and which is orientated axially in the direction of the second bearing device 11. The web has, when viewed as a longitudinal section, a hook-like contour which is constructed as a contour partner with respect to the active contour 13*a*. For example, the active contour 13*a* and/or the counter-contour 13*b* may be resiliently deformable so that, during the assembly of the second bearing device 11, at least one of the two contours 13*a, b* can become resiliently deformed and the two contours can subsequently engage with each other. For example, an annular snap-fit connection is consequently formed.

Figure 2:
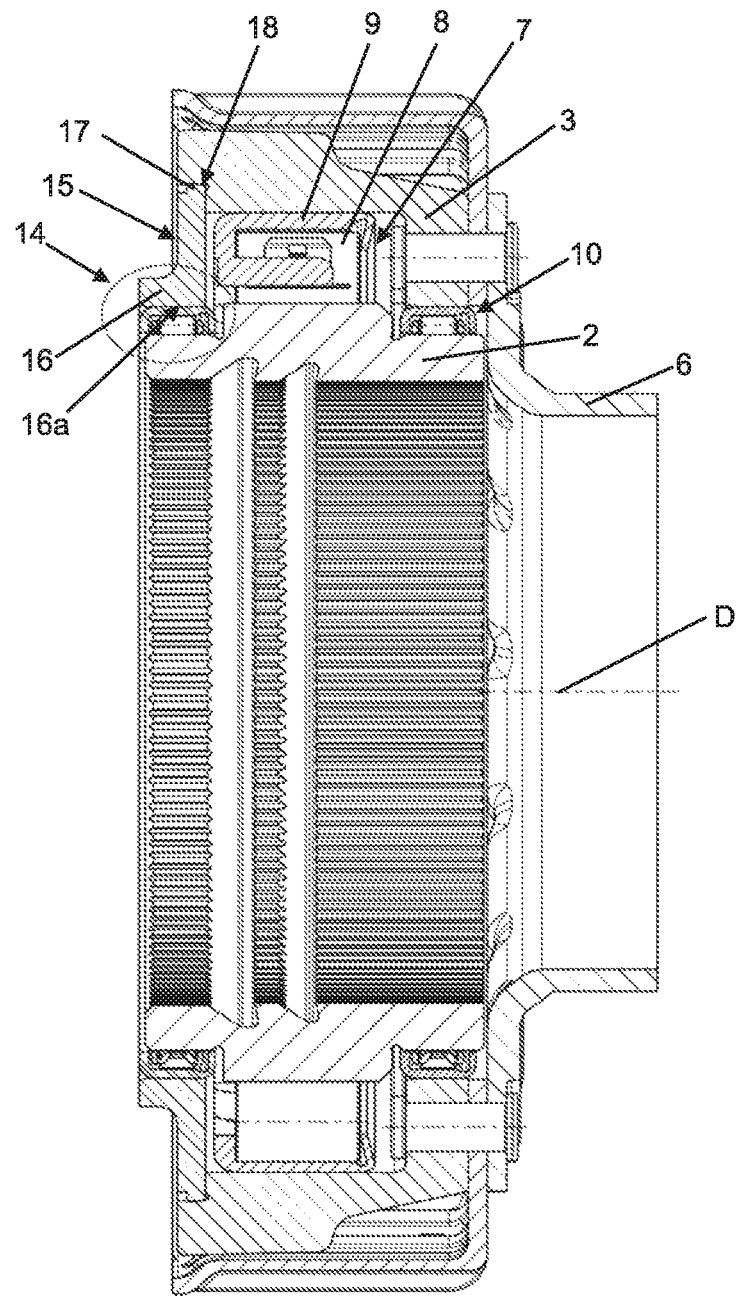
FIG. 2 is a sectioned illustration of a modified overrunning clutch unit as an additional embodiment of the disclosure.

FIG. 2 shows a modified overrunning clutch unit 1 from FIG. 1. The overrunning clutch unit 1 comprises the overrunning clutch system inner ring 2 and the overrunning clutch system outer ring 3. The structure, arrangement and function of the overrunning clutch system inner ring 2 may correspond to the overrunning clutch system inner ring 2 as described in FIG. 1.

At the first axial side and at the first axial end region of the two overrunning clutch system rings 2, 3 the first bearing device 10, as described in FIG. 1, may be arranged. Opposite this, at the second axial side and at the second axial end region of the two overrunning clutch system rings 2, 3, there may be formed as the second bearing device 11 another roller bearing device 14, in particular a radial needle bearing, which supports and centers the overrunning clutch unit 1 at an open side.

The overrunning clutch unit 1 comprises a flange element 15 which may be arranged between the additional roller bearing device 14 and the overrunning clutch system outer ring 3. The flange element 15 may have the shape of a rotationally symmetrical collared sleeve. It comprises a rotationally symmetrical bearing portion 16 with a bearing face 16*a* and a positive-locking portion 17. With the bearing face 16*a*, the flange element 15 may be supported on the additional roller bearing device 14.

In order to form a positive-locking connection with respect to the positive-locking portion 17, the overrunning clutch system outer ring 3, in particular in place of the counter-contour 13*b* provided in FIG. 1, may have a rotationally symmetrically continuous or interrupted receiving member 18 in which the positive-locking portion 17 engages. The engagement is carried out, for example, as an interference fit and/or press fit. The flange element 15 is thereby connected to the overrunning clutch system outer ring 3 and arranged in a positive-locking manner between the additional roller bearing device 14 and the overrunning clutch system outer ring 3.

LIST OF REFERENCE NUMERALS

1 Overrunning clutch unit
2 Overrunning clutch system inner ring

3 Overrunning clutch system outer ring
4 Inner tooth arrangement
5 Carrier housing
6 Flange
7 Drawn cup roller clutch
8 Clamping member
9 Gear shift cage
10 First bearing device
11 Second bearing device
11*a* Sleeve portion
11*b* Flange portion
12 Plain bearing contact
12*a* First sliding face
12*b* Second sliding face
13 Snap-fit connection
13*a* Active contour
13*b* Counter-contour
14 Alternative bearing device
15 Flange element
16 Bearing portion
16*a* Bearing face
17 Positive-locking portion
18 Receiving member

What is claimed is:

1. An overrunning clutch unit, comprising:
an overrunning clutch system inner ring and an overrunning clutch system outer ring, the overrunning clutch system inner ring being arranged coaxially in relation to a rotation axis (D) with respect to the overrunning clutch system outer ring, and wherein the overrunning clutch system inner ring and the overrunning clutch system outer ring can be rotated relative to each other;
a plurality of clamping members configured to transmit a torque between the two overrunning clutch system rings in one peripheral direction, wherein the clamping members are arranged between the overrunning clutch system inner ring and the overrunning clutch system outer ring;
a first bearing device configured to support the two overrunning clutch system rings, wherein the first bearing device is arranged between the overrunning clutch system inner ring and the overrunning clutch system outer ring at a first axial side of the clamping members; and
a second bearing device configured to support the two overrunning clutch system rings, wherein the second bearing device is arranged at a second, opposing, axial side of the clamping members so that a tilting of the overrunning clutch system inner ring relative to the overrunning clutch system outer ring is prevented, wherein the second bearing device is a plain bearing device connected to the overrunning clutch system inner ring or the overrunning clutch system outer ring by a snap-fit connection.

2. The overrunning clutch unit as claimed in claim 1, wherein the first bearing device is a roller bearing device.

3. The overrunning clutch unit as claimed in claim 1, wherein the second bearing device is connected to a first of the two overrunning clutch system rings, wherein the second bearing device has a first sliding face and wherein the second of the two overrunning clutch system rings has a second sliding face, wherein a plain bearing contact is formed between the first and the second sliding faces.

4. The overrunning clutch unit as claimed in claim 3, wherein the second bearing device and/or the plain bearing contact is dry lubricated and/or lubricated by a lubricant.

5. The overrunning clutch unit as claimed in claim 3, wherein the second bearing device has a sleeve portion and a collar portion, wherein the second bearing device is connected by the collar portion to the first of the two overrunning clutch system rings, wherein the sleeve portion has the first sliding face and is in abutment with the second of the two overrunning clutch system rings.

6. The overrunning clutch unit as claimed in claim 1, wherein the second bearing device is formed from a non-ferrous heavy metal.

7. The overrunning clutch unit as claimed in claim 1, wherein the second bearing device has an active contour and the overrunning clutch system inner ring or the overrunning clutch system outer ring has a counter-contour, wherein the active contour and the counter-contour form the snap-fit connection.

8. A gear mechanism device having the overrunning clutch unit as claimed in claim 1.

* * * * *